US007035814B2

(12) United States Patent
Malkin et al.

(10) Patent No.: US 7,035,814 B2
(45) Date of Patent: Apr. 25, 2006

(54) METHOD FOR DELIVERING A PRODUCT TO A REGISTER ACCORDING TO A TRACKED LOCATION OF A MOBILE DEVICE

(75) Inventors: Peter K. Malkin, Arsdley, NY (US); Wendy Anne Kellogg, Yorktown Heights, NY (US); Lewis Alexander Morrow, Wellesley, MA (US)

(73) Assignee: International Buisness Machines Corporation, Armonk, NY (US)

( * ) Notice: Subject to any disclaimer, the term of this patent is extended or adjusted under 35 U.S.C. 154(b) by 502 days.

(21) Appl. No.: 09/904,088

(22) Filed: Jul. 12, 2001

(65) Prior Publication Data

US 2003/0014269 A1 Jan. 16, 2003

(51) Int. Cl.
*G06F 17/60* (2006.01)

(52) U.S. Cl. .............................. 705/23; 705/26; 186/52; 235/383

(58) Field of Classification Search ................... 705/1, 705/13, 14, 16, 21, 26, 27, 28, 400, 23; 707/1, 707/3, 4, 5, 6, 7, 9, 10, 100, 102, 103 R, 707/104.1; 186/52, 55, 59; 235/375, 383
See application file for complete search history.

(56) References Cited

U.S. PATENT DOCUMENTS

| 3,741,345 | A | * | 6/1973 | Saridis | 186/55 |
| 5,186,281 | A | * | 2/1993 | Jenkins | 186/55 |
| 5,339,239 | A | * | 8/1994 | Manabe et al. | 705/1 |
| 5,418,948 | A | * | 5/1995 | Turtle | 707/4 |
| 5,434,394 | A | * | 7/1995 | Roach et al. | 235/375 |
| 5,595,264 | A | * | 1/1997 | Trotta, Jr. | 186/56 |
| 5,740,369 | A | * | 4/1998 | Yokozawa et al. | 395/200.47 |
| 5,880,449 | A | * | 3/1999 | Teicher et al. | 235/383 |
| 5,890,136 | A | * | 3/1999 | Kipp | 705/22 |
| 5,933,813 | A | * | 8/1999 | Teicher et al. | 705/26 |
| 5,933,814 | A | * | 8/1999 | Rosenberg | 705/26 |
| 6,123,259 | A | * | 9/2000 | Ogasawara | 235/380 |
| 6,243,447 | B1 | * | 6/2001 | Swartz et al. | 379/93.12 |

(Continued)

FOREIGN PATENT DOCUMENTS

JP          10340329 A   * 12/1998

OTHER PUBLICATIONS

Tristram, C. "Behind BlueEyes", Technology Review (Cambridge, Mass), May 2001.*

*Primary Examiner*—Igor N. Borissov
(74) *Attorney, Agent, or Firm*—F.Chau & Associates,LLC

(57) ABSTRACT

A method for providing sales support includes issuing a customer a mobile device and a corresponding identification, wherein the mobile device issues an electronic service request including a customer purchase order for a product having a product identifier, receiving the electronic service request including the customer purchase order, tracking a location of the mobile device issued to the customer, and delivering the product to a checkout register according to the location to which the mobile device is tracked.

16 Claims, 8 Drawing Sheets

U.S. PATENT DOCUMENTS

| | | | |
|---|---|---|---|
| 6,363,411 B1 * | 3/2002 | Dugan et al. | 709/202 |
| 6,439,345 B1 * | 8/2002 | Recktenwald et al. | 186/55 |
| 6,512,919 B1 * | 1/2003 | Ogasawara | 455/422.1 |
| 6,516,311 B1 * | 2/2003 | Yacoby et al. | 707/3 |
| 6,625,580 B1 * | 9/2003 | Tayama | 705/26 |
| 2001/0014870 A1 * | 8/2001 | Saito et al. | 705/14 |
| 2002/0065879 A1 * | 5/2002 | Ambrose et al. | 709/203 |
| 2002/0111869 A1 * | 8/2002 | Shuster et al. | 705/23 |
| 2002/0139859 A1 * | 10/2002 | Catan | 235/472.02 |
| 2002/0161651 A1 * | 10/2002 | Godsey et al. | 705/22 |
| 2002/0169686 A1 * | 11/2002 | Zweben et al. | 705/26 |
| 2002/0188501 A1 * | 12/2002 | Lefkowith | 705/14 |

* cited by examiner

METHOD FOR DELIVERING A PRODUCT TO A REGISTER ACCORDING TO A TRACKED LOCATION OF A MOBILE DEVICE

BACKGROUND OF THE INVENTION

1. Field of the Invention

The present invention relates to a method for indicating consumer demand, and more specifically, to a method enabling a customer to communicate with a business regarding a product of interest.

2. Discussion of the Prior Art

In today's just-in-time marketplace, satisfying consumer demands for products and information in a timely manner is important to making a sale. Missing an opportunity to provide helpful information or a desirable product to the consumer can lead to lost sales.

The ability to keep the customer interested in the product is just as important as having the item available. Thus, stock information may be helpful to a business seeking to satisfy the consumers desire for information. However, providing the information typically requires employees to service the consumer demands. Employees can be expensive and unreliable. In addition, the quality of the employee's knowledge may not be measurable, resulting in unpredictable performance.

The customer who is able to wander through a store without being serviced by an employee may be more inclined to abandon the store without making a purchase and seek the product elsewhere. This can also lead to future lost sales where, for example, the consumer seeks future products from competitors.

One purposed method is the use of suggestion boxes where consumers can comment on the business. However, suggestion boxes rely on the selflessness of the customer and may not enable a customers to ask the question they want to in order to make the desired purchase.

Customer service counters are another example of a prior art method of servicing customers, however in order to do so, the customer needs to interrupt their activity, determine the position of the customer service counter, and wait on a line. Often customers are not willing to go through these steps to answer a question. By the time the consumer has finished shopping, they have forgotten their question or simply lost interest.

A customer shopping in a given store can call the business using a cell phone and ask a question. This approach fails because stores may not be equipped to handle questions about products which are local in nature from outside phone calls; further the phone call may need to be relayed to the appropriate department before a product specific question can be answered. Such phones call may not provide the business with the specific product identification needed to answer the consumer's question. Therefore, a need exists for a method of servicing a customer with information and/or products in a timely fashion.

SUMMARY OF THE INVENTION

According to an embodiment of the present invention, a method for providing sales support comprises receiving an electronic service request including a product identifier and a customer query from a customer within a sales environment, retrieving data corresponding to the product identifier from a product database, determining a portion of the data relating to the customer query, and delivering an electronic reply to the customer including the portion of the data corresponding to the product identifier and relating to the customer query.

The method includes issuing the customer a mobile device, wherein the mobile device issues the electronic service request. The method further includes issuing the customer a mobile device, wherein the mobile device determines the product identifier.

The method includes issuing the customer a mobile device and a corresponding customer identification. The customer identification is persistent. The customer identification is issued with the service request. The method further comprises storing the service request in a customer database corresponding to the customer identification.

The product identifier is determined according to one of a product radio frequency identification tag, a bar code scan, a verbal description provided by the customer, a digital photo, and an alphanumeric identification.

According to an embodiment of the present invention, a method for providing sales support, enabling a business and a customer to communicate via a mobile device, includes issuing the customer the mobile device, receiving an electronic service request including a product identifier and a customer query via the mobile device, and retrieving data corresponding to the product identifier from a product database. The method includes determining a portion of the data corresponding to the product identifier and relating to the customer query, and delivering an electronic reply to the mobile device including the portion of the data corresponding to the product identifier and relating to the customer query.

The method includes issuing the customer a customer identification, wherein the customer identification associates the mobile device with the customer. The database stores the association between the mobile device and the customer. The method includes making the association upon issuing the mobile device to the consumer, and breaking the association upon return of the mobile device to the business.

The method further comprises tracking the customer within the store based on a position of the mobile device in relation to a plurality of beacons. A server stores positions over time as position data. The method includes logging the position data, and mining the position data for a pattern of movement.

The product identifier is determined according to one of a product radio frequency identification tag, a bar code scan, a verbal description provided by the customer, a digital photo, and an alphanumeric identification.

According to an embodiment of the present invention, a method for providing interactive sales support to a customer via a mobile device comprises receiving user input via the mobile device, determining whether the user input is a customer query, if so, adding the customer query to a query queue and delivering an acknowledgment to the mobile device confirming the receipt of the customer query, determining a response to the customer query in the query queue, and delivering the response to the mobile device.

The step of determining the response further comprises parsing the customer query for at least one key word, and retrieving a response corresponding to the key word from a database.

The method includes determining whether the user input is a product identifier, if so, retrieving data corresponding to the product identifier from a database, and delivering the response to the mobile device including the data corresponding to the product identifier.

BRIEF DESCRIPTION OF THE FIGURES

Preferred embodiments of the present invention will be described below in more detail, with reference to the accompanying drawings.

DETAILED DESCRIPTION OF PREFERRED EMBODIMENTS

Figure 1:
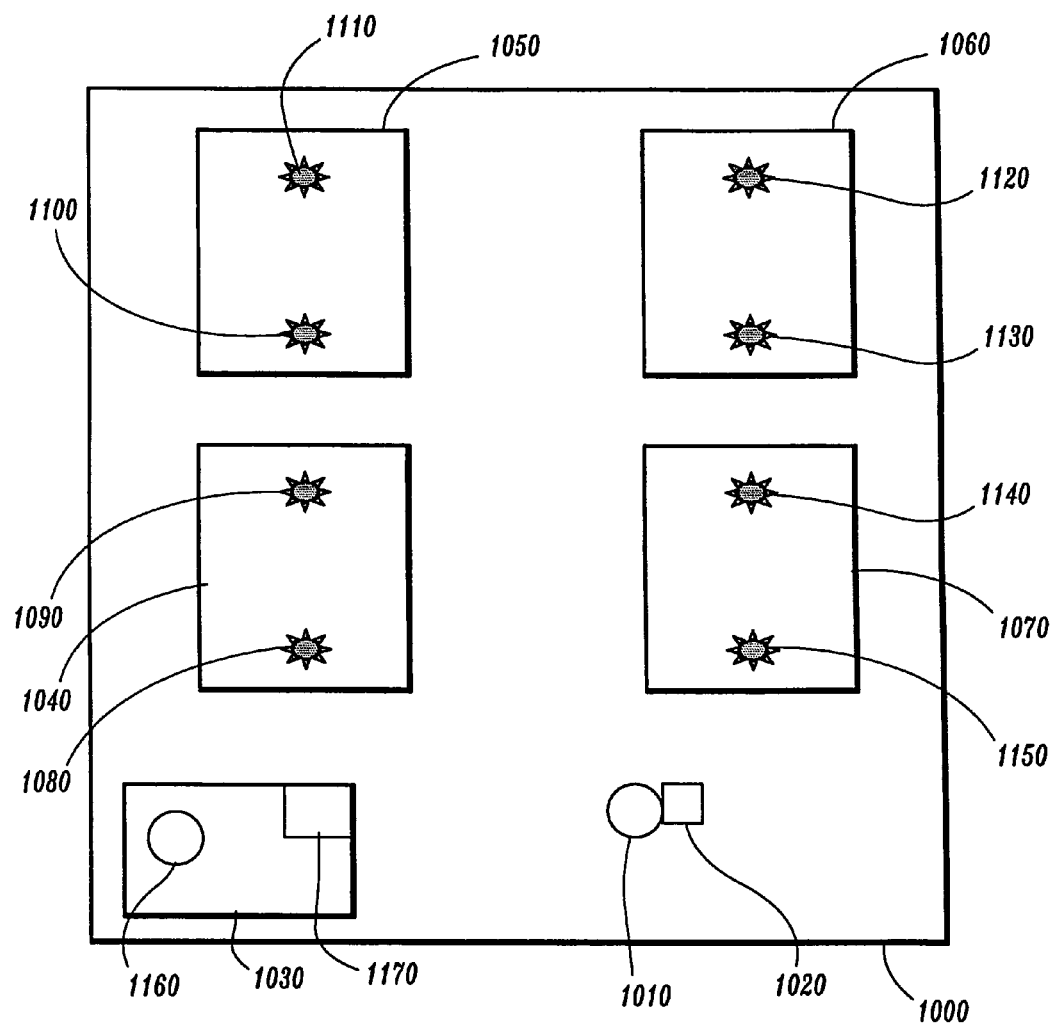
FIG. 1 is an overview of a store instrumented according to an embodiment of the present invention.

According to an embodiment of the present invention, FIG. 1 depicts an illustrative view of a store 1000, a customer 1010 carrying a mobile device 1020 with the store having a Customer Help Center 1030, an employee 1160 and a server Store Server 1170. The store includes four racks of products 1040–1070, each rack having two radio frequency (RF) identification (ID) emitters 1080–1150 located at either end of the rack.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture. Preferably, the machine is implemented on a computer platform having hardware such as one or more central processing units (CPU), a random access memory (RAM), and input/output (I/O) interface(s). The computer platform also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present invention provided herein, one of ordinary skill in the related art will be able to contemplate these and similar implementations or configurations of the present invention.

Figure 2:
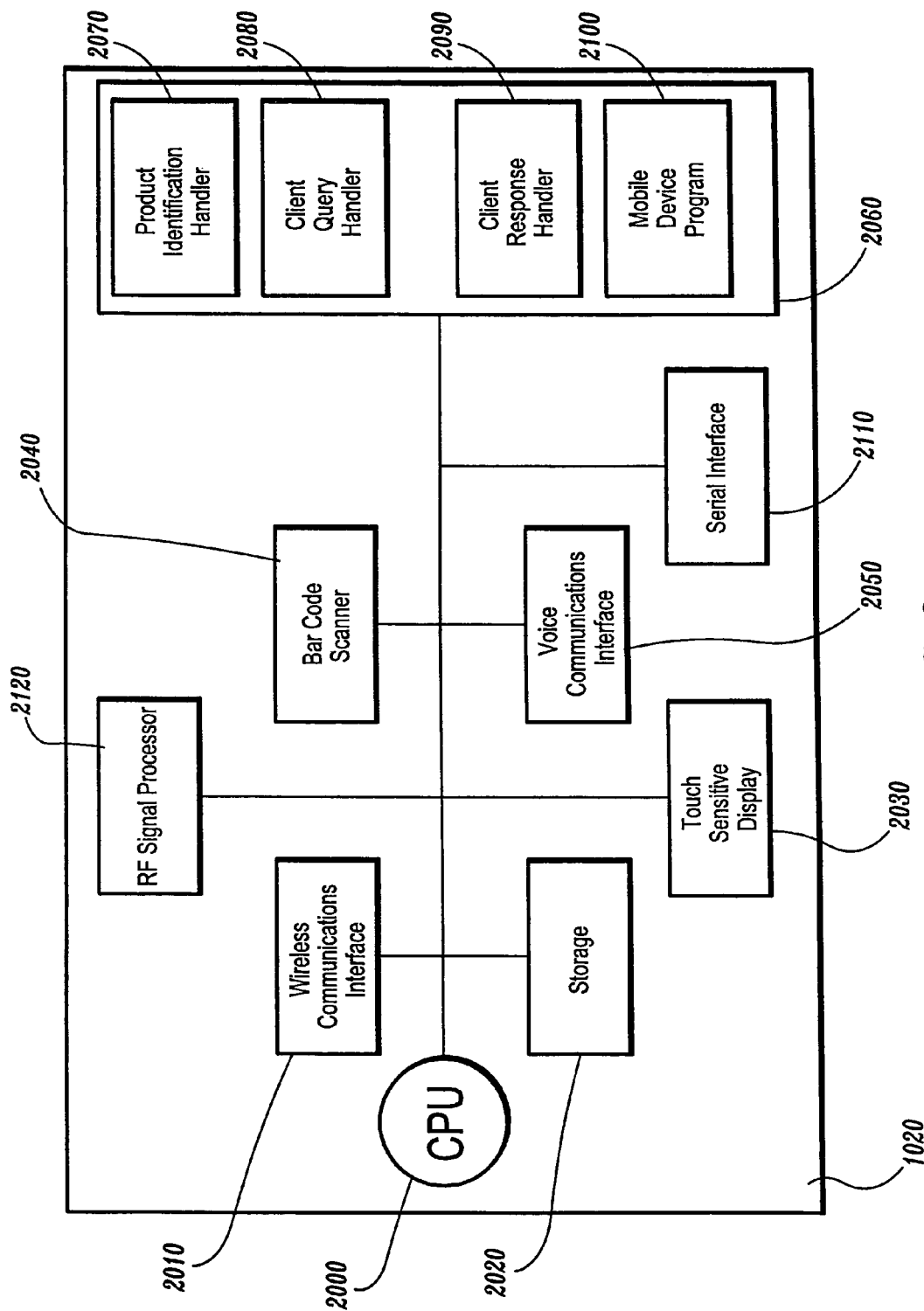
FIG. 2 is block diagram of an architecture of a mobile device according to an embodiment of the present invention.

FIG. 2 shows an example of the mobile device 1020 carried by the customer 1010 and used to communicate with the server 1170 and the employee 1160. The mobile device 1020 preferably includes a central processing unit, or CPU 2000, a wireless communications interface 2010 (e.g., including, but not limited to those supported by IEEE standards 802.11a and 802.11b, and developing standard 802.11g), a storage device 2020, such as a programmable nonvolatile RAM or DASD, an RF signal processor 2100, a touch-sensitive display 2030, a bar-code scanner 2040, a voice communications interface 2050 including, but not limited to an RF-based walkie-talkie two-way communicator, or a voice digitizer such as IBM's ViaVoice® product; a memory 2060, such as RAM, and a serial communications interface (e.g., standard RS232, USB, or ISB) 2110.

According to the present invention, the Mobile Device Program is preferably embodied as computer executable code loaded from storage 2020 into memory 2060 for execution by CPU 2000. The memory 2060 preferably includes the Product Identification Handler 2070, the Client Query Handler 2080, the Client Response Handler 2090, and the Mobile Device Program 2100. The mobile device 1020 can run on any mobile computing node, including, for example, products such as are sold by Symbol, or the KYOCERA SmartPhone®. The composite mobile device 1020 described in FIG. 2, can be constructed by taking adding components to a based unit. For example, a two-way radio-based communications device (e.g., a Motorola walkie-talkie) can be added simply by joining the two devices together back-to-back. Further, additional components, e.g., a bar code scanner, a digital camera, or video camera, can be connected and made to communicate with the base mobile device 1020 via, for example, the serial communications interface 2110.

Figure 3:
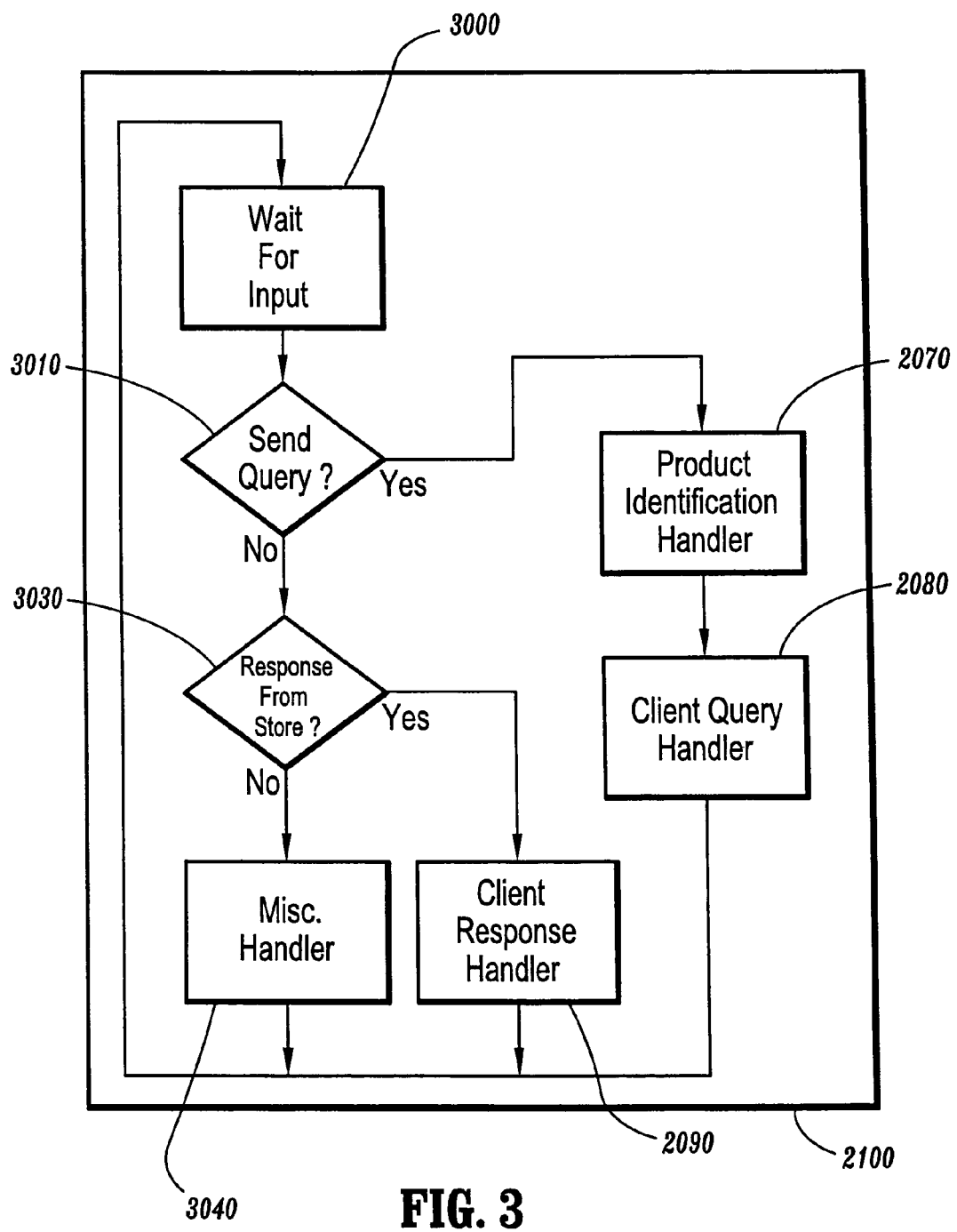
FIG. 3 is a flow diagram of the of a mobile device program according to an embodiment of the present invention.

FIG. 3 shows a block diagram of the program logic and flow of the Mobile Device Program 2100. In block 3010, the program determines whether the customer wants to send a query. If so, the Product Identification Handler 2070 is called. This handler 2070, enables the customer 1010 to uniquely identify a given product to the store server 1170. Methods to do this include using the mobile device's bar code scanner 2040 to read a bar code label associated with the given product—this label either affixed to the given product, or labeling the place (e.g., shelf space) where the product is located. Products can also be identified using RF ID tags read by the mobile device's RF Signal Processor 2100. Further, the customer 1010 can read a unique alphanumeric identifier from a tag associated with the given product, and then enter this ID manually in the mobile device 1020 using its touch-sensitive display 2030. Those with regular skill in the art will appreciate that a customer 1010 can also enter the ID using a keyboard, some form of which is usually included with all PDA's and cell phones. The product ID can also be sent by the customer 1010 to the store server 1170 by the customer 1010 reading the product's ID to the store employee 1160 using the mobile device's voice communications component 2050 and a Store Server's voice communications interface, FIG. 4, block 4020. Similarly, a product can be identified by the customer's taking a digital photograph of the given product, using either a digital camera, or a digital video camera, uploading the digital image to the mobile device 1020 (e.g., via the mobile serial port), having the image sent to the store server 1170, and then translated into a more machine friendly form by the store employee 1160, for example, by having the employee 1160 enter the alphanumeric identifier for the given product after recognizing it from the digital photograph.

Figure 6:
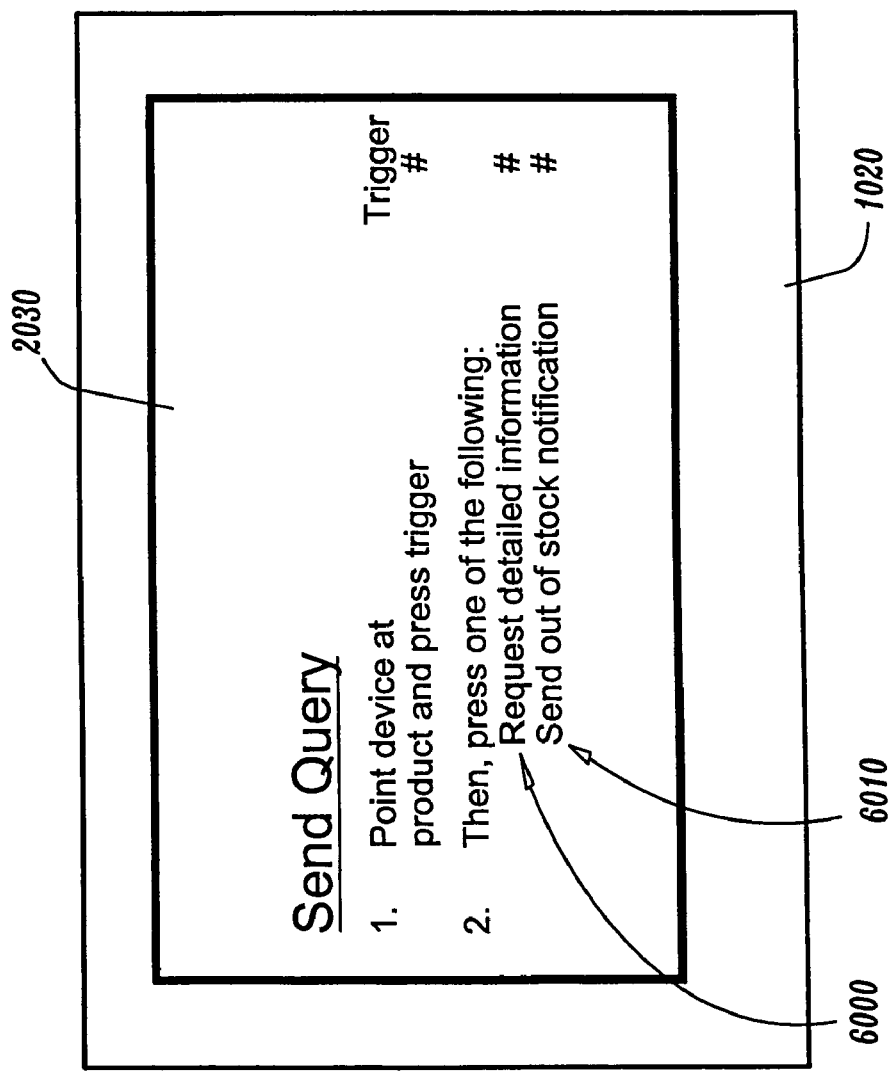
FIG. 6 is an illustrative example of a mobile device query prompt architecture according to an embodiment of the present invention.

After identifying the product, a Client Query Handler 2080 is called. The Client Query Handle 2080 allows the customer 1010 to specify a question or comment regarding the given product they just identified. As shown in FIG. 6, this can include specifying whether they want more detailed information 6000, or whether they want to indicate that a item they want is out of stock 6010 (at least as far as they can see, looking at the current store rack, one of 1040–1070). Those skilled in the art will appreciate that, using the voice communication's component 2050, the customer 1010 can add a voice message to their query. One skilled in the art will also appreciate that in addition to aiding the store employee 1160 in helping the customer 1010, the entire query, including, inter alia, product id, type of query, and additional information (e.g., a digitized form of the customer's verbal comment), can be stored in the store's database, FIG. 4, block 4090, and later used in data mining explorations of the store. These explorations including, but not limited to, analysis of insufficient stocking (e.g., particular products always seem to be out of stock), confusing instructions (e.g., many customers asked for further information regarding special promotional sale, presumably because the explanation of the sale's benefit to the customer was not clear).

One with regular skill in the art will also appreciate that the query sent by the customer 1010 can include an indication of the customer's location in store 1000. This location information can be sent indicating, inter alia, which RF emitter 1080–1150 the mobile device is closest to, this data determined by the mobile device's RF Signal Processor 2100 calculating which emitter was sending the strongest signal.

Referring to FIG. 3, once the customer 1010 has finished specifying their query, it is then sent to the Store Server 1170 using the wireless communication interface 2010. One with regular skill in the art will appreciate that this request can be sent using the HTTP protocol, the Mobile Device 1010 acting like web browser, with the request formatted using, for example, HTML or XML. Following this transfer, control continues at block 3000.

Figure 7:
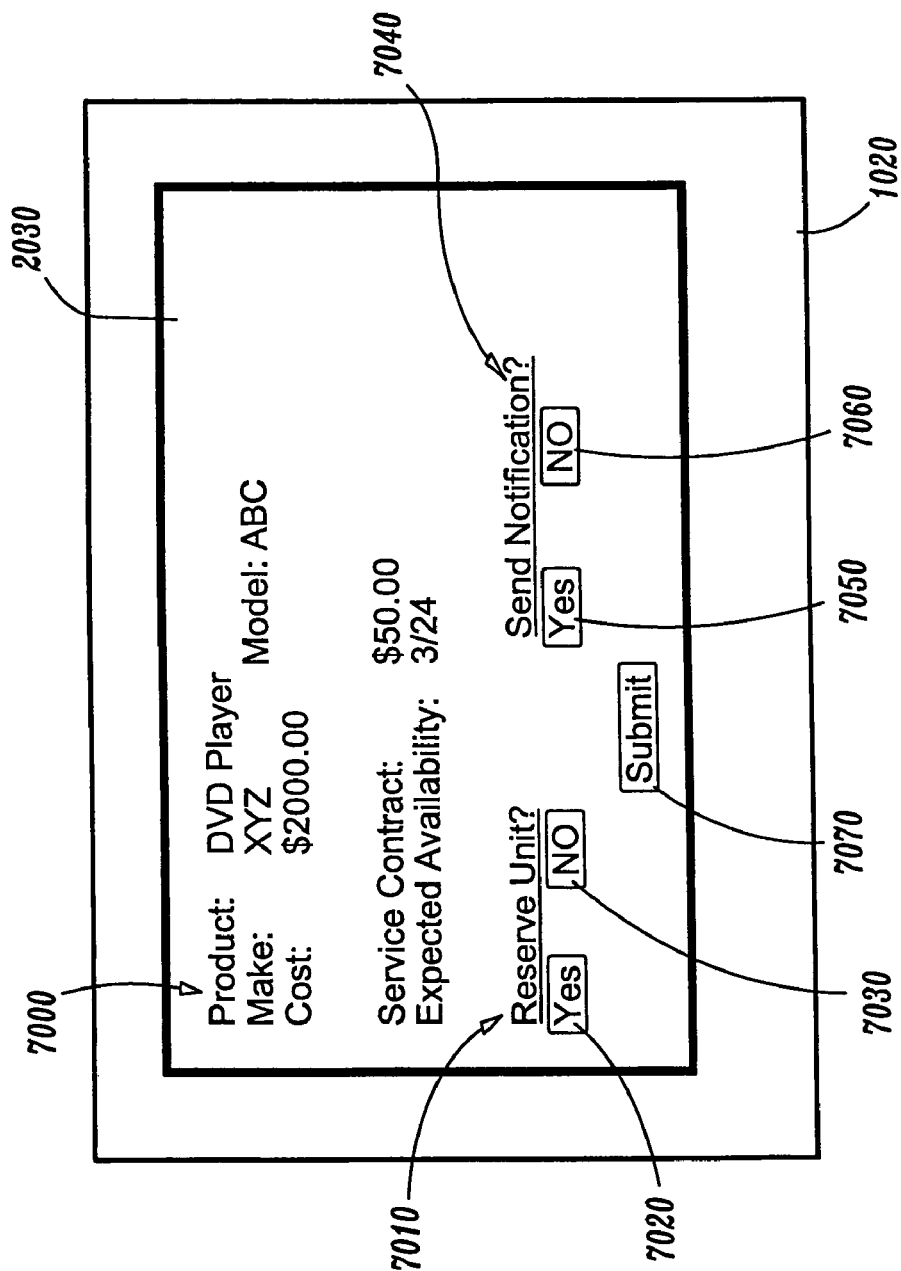
FIG. 7 is an illustrative example of returned data being displayed by the mobile device according to an embodiment of the present invention.

In block 3030, the Mobile Device Program 2100 determines whether the current input is a response from the Store Server 1160. If so, the Client Response Handler 2090 is called. The Client Response Handler 2090 displays the returned information on the Touch-Sensitive Display 2030. Referring to FIG. 7 showing an example of the Touch-Sensitive Display 2030, the server has returned the name, make, model, purchase price, service contract cost and expected availability information about a DVD player 7000. Those with regular skill in the art will appreciate that the returned information can also include audio and/or video. The data returned by the Store server 1160 can include various options that the customers can specify. For example, whether the customer would like to reserve a unit when it becomes available, the customer 1010 specifying their response selecting the "Yes" 7020 or "No" 7030 graphical button. Similarly another option 7040, allows the customer to indicate whether they would like to be notified when the given product becomes available by selecting either the "Yes" 7050 or "No" 7060 graphical button on the Touch-Sensitive Display 2030. One with regular skill in the art will appreciate that the store 1000 and customer 1010 can arrange the method of notification (e.g., telephone call, postal carrier, electronic mail, or page) either when the customer 1010 is given a mobile device 1020 when the customer enters the store 1000, or beforehand, e.g., when the customer applies for a store card, such as, a credit card or preferred shopper card. Once these options are specified, the customer (1010) triggers the sending of their response by selecting the "Submit" 7070 graphical button. The response from the server and new request from the client can be transferred using the HTTP protocol, the content of these transfers can (but need not be) formatted using HTML or XML. Following the transfer, control continues at block 3000.

The communications link between the customer and the business can facilitate exchanges, transactions, polling, etc. For example, when a customer indicates that a product is out of stock, the Store 1000 can ask the customer 1010 whether they would like the store to order the product for them, including specifying the quantity desired, when the product is likely to arrive, whether the customer would like the store to try and retrieve stock from a another source, etc.

If the input is not a response from the Store Server 1160, then a miscellaneous handler is called in block 3040, following which control continues at block 3000.

Figure 4:
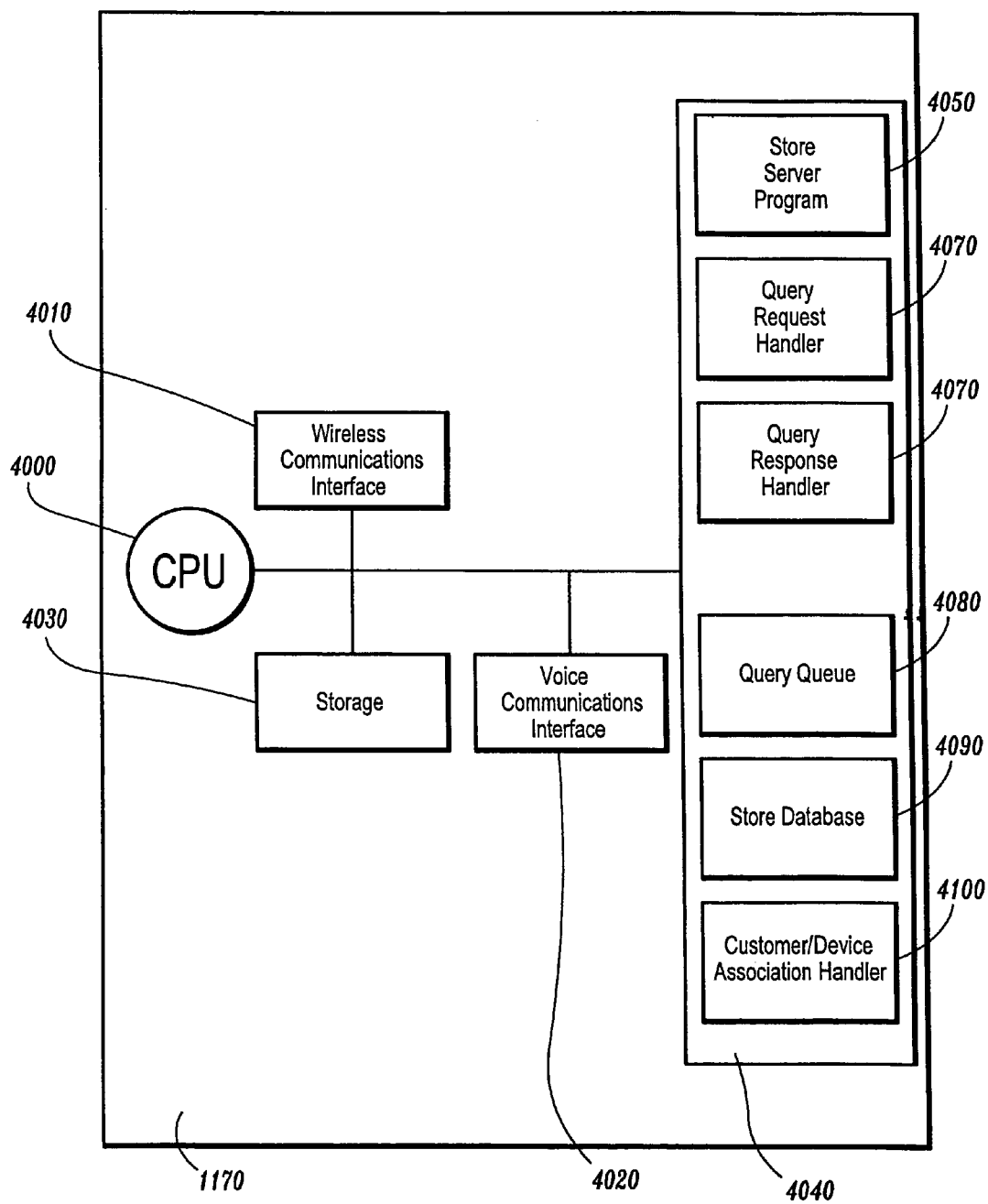
FIG. 4 is block diagram of an architecture of a server according to an embodiment of the present invention.

FIG. 4 depicts the components of an example of the Store Server 1170. The Store Server 1170 can be used to communicate and respond to customer 1010 queries, and used to store and analyze these queries post hoc. The Store Server 1170 includes, inter alia, a central processing unit, or CPU 1170, a wireless communications interface 4010 (e.g., including, but not limited to those supported by IEEE standards 802.11a and 802.11b, and developing standard 802.11g); a voice communications interface 4020, including, but not limited to an RF-based walkie-talkie two-way communicator, or a voice digitizer such as IBM's via voice product; a storage device 4030, such as hard disk or CD-ROM; and a memory 2040, such as RAM. According to the present invention, the Store Server Program 4050, preferably embodied as computer executable code, is loaded from storage, such as hard disk 4030 into memory 4040 for execution by CPU (4000). The memory 4040 preferably includes the Store Server Program 4050, the Query Request Handler 4060, the Query Response Handler 4070, the Query Queue 4080, the Store Database 4090, and the Customer/Device Association Handler 4100. The Store Server 1170 can also run on any computing node, including, but not limited to, products such that sold under the trademarks S/390 or RS/6000 by IBM. Those with regular skill in the art will appreciate that the composite server 1170 described in FIG. 4, can include of one or more devices, e.g., a Motorola two-way walkie-talkie based voice communications Interface 4010 collocated with the rest of the Server 1170.

Figure 5:
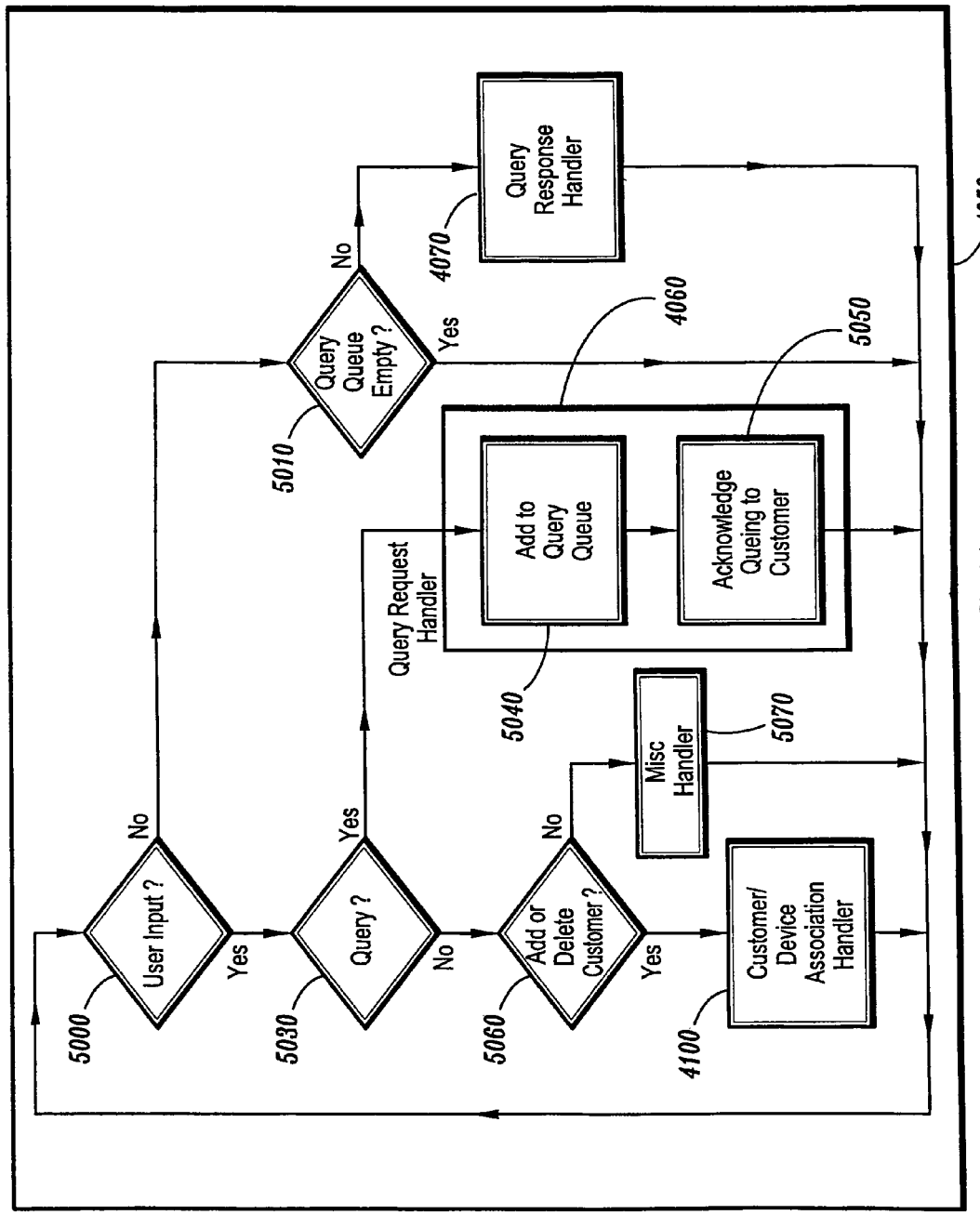
FIG. 5 is a flow diagram of the of a store server program architecture according to an embodiment of the present invention.

FIG. 5 illustrates the program logic and flow of the Store Server Program 4050. In block 5000, the program determines whether there is any user input. If not, then in block 5010, the program 4050 determines whether there are any pending queries in the Query Queue 4080. If not, then control continues at block 5000. If there are pending queries, then the Server's Query Response Handler 4070 is invoked. Query Response Handler 4070 takes the next pending query from the Query Queue 4080 and processes it, this processing including logging the query—including its full contents—in the Store Database 4090. Such logging enables the store to analyze the queries to check and adjust its stocking schedule. For example, if a musical instrument store found that there were frequent queries indicating it was out of stock of a particular make of guitar, then the store can infer that additional units of the make should be stocked to avoid the loss of these sales.

Responses can be created automatically, e.g., by parsing the customer's 1010 query for key words and then using these words for Database 4090 lookups, or with manual help from a Store Employee 1160, such as listening to the customer's verbal product description, determining the corresponding part number, and then issuing the needed query. One with regular skill in the art will appreciate that the employee 1160 may have to carry on a two-way conversation with the customer to clarify which product the customer 1010 actually wants. In addition to the types of information specified in the example shown in FIG. 7, the data can also include indications of current sales prices and the savings they represent, other locations in the store 1000 where the specified product can be found (in cases where the customer has indicated that the given product is out of stock); other comparable products that the customer 1010 might want to consider, etc. The response is sent to the requesting customer 1010 via the Wireless Communication Interface 4010. Following this, program control continues at block 5000.

If there is user input, the input is checked to determine whether the input is a customer query, block 5030. If the input is a customer query, the Query Request Handler 4060 is invoked. In block 5040, the Query Request Handler 4060 adds the query to the Query Queue 4080. In block 5050, the Query Request Handler 4060 sends an acknowledgment to the customer 1010 confirming that the Store 1000 has received the customer 1010 request. Those with ordinary skill in the art will appreciate that this confirmation can include an indication of the number of queries before the given customers in Query Queue 4080, as well as an estimate of the time the customer 1010 will have to wait for a response. After this acknowledgment is sent to requesting customer 1010 via the Wireless Communications Interface 4040, program control continues at block 5000.

If the user input is not a query, the method determines whether the input is an addition or deletion of a customer/device association. Such requests are made whenever a customer 1010 is given or returns a mobile device 1020, since a correspondence between the given customer 1010 and the given mobile device 1020 needs to be added or deleted. If not, then in block 5070, the miscellaneous handler is called, following which program control continues at block 5000. Otherwise, the Customer/Device Association Handler 4100 is invoked. This routine is given a customer ID and that of a particular mobile device 1020 in the case of an addition; or the ID of a mobile device 1020 in the case of a deletion. As stated above, the routine either adds or deletes an association between the customer's ID and that of the mobile device. This association, also provided on request by the Customer/Device Association Handler 4100, is used by the Query Response Handler 4070 to build appropriate responses. For example, if a long-time, highly-valued customer indicates that a product they want is currently out of stock, and the store 1000 finds that it does, in fact, have the product, just not out on display, the store may tell the customer to wait while they retrieve the product for them, bringing it to the customer's current location in the store. Following the execution of the Customer/Device Association Handler 4100 program control continues at block 5000. According to an embodiment of the present invention, a device can be fixed at a location within the store 1000. Thus, any customer can communicate with the store 1000.

Store Server Program 4050 can be implemented using, for example, IBM's ICSS HTTP (web) server, which provides an application program interface (API) (the ICAPI) enabling web site developers to write software modules that are used by the server in the processing of requests, wherein the server hands control to the modules. The modules hand control back to base HTTP server for the completion of the request. Store Server Program 4050 can be an HTTP (web) server, accessible from standard web clients. Thus, a customer 1010 can request the state of one of their queries via a standard web client after they have left the store. For example, if a customer left an unresolved query at a pharmacy, for example, a desired brand of vitamins was out of stock, the customer could check in with the store's server from a web client at work on Monday, to see whether the expected new stock had in fact arrived.

Figure 8:
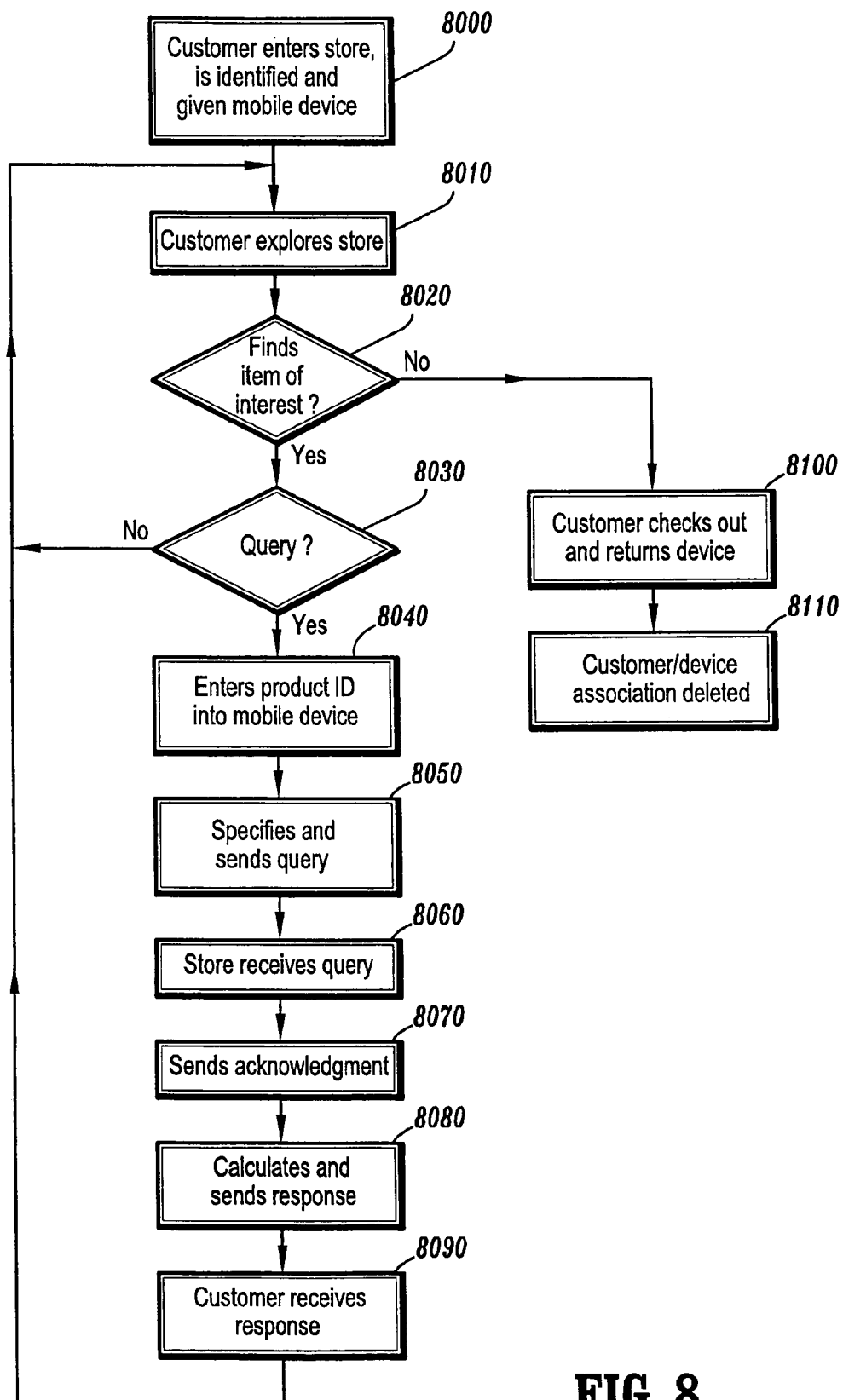
FIG. 8 is a flow diagram illustrating a method according to an embodiment of the present invention.

Referring to FIG. 8, suppose a customer, A 1010 walks into an appliance store 1000 in search of a new DVD player. As A walks through the front door, he is asked for his store membership card by the employee, B stationed at the door, who then slides the card through a scanner. Once the card is authenticated, B gives A back his card and hands him a mobile device 1020 to use while he shops, block 8000. One with skill in the art will appreciate that A's identity can also have been obtained using a biometric method such as a fingerprint or retinal scan. A 1010 then explores the store in search of a DVD player, block 8010. After finding the DVD section in the store and comparing the prices and features, A 1010 decides to buy Model 501, block 8020. He then finds that there are not any available in stock, and so decides to query the store to find out if and when he can get a unit for himself, block 8030. He 1010 then takes his mobile device 1020, holds it up to the bar code on the label attached to the display model, and presses the scan trigger, block 8040. Once scanned, A indicates that the given product is out of stock by selecting the corresponding option on his mobile device's touch-sensitive display 2030, this causing A's query to be sent to the Store Server 1170, block 8050.

The Store Server 1170 receives A's query via its Wireless Communication Interface 4010, block 8060, and immediately sends A back an message acknowledging the receipt of his query 8070. The Query Response Handler 4070 automatically looks up the product that A has requested and finds that, according to its records, six units are still in the store. C, the employee 1160 currently running the store's help center 1030 is notified that there still should be available units in the store, this warning sent to him via an alert posted on store server's 1170 console. C 1160 checks with the store's back room, verifies the existence of the available units, and then sends A 1010 a response, block 8080, indicating this, along with a note indicating that one of the units will be forwarded for him 1010 to the checkout register. A 1010 receives the response on his mobile device 1020, block 8070, and then decides to continue shopping, block 8010. A then goes and finds DVD-versions of several of his favorites movies, block 8020. Not having funds for further purchases, A decides that he's done, block 8020. So he 1010 goes to the checkout register, where he is given the requested Model 501. While checking out, A gives the cashier, D, the mobile device that he was carrying, block 8100. D enters the ID of the device into the store server 1170 web interface he is running on the computer at the register, and indicates that the device has been returned, this causing the association between A 1010 and the device 1020 to be deleted from the Customer/Device Association Handler's 4100 current list, block 8110.

One with regular skill in the art will appreciate that a customer can use a personal a mobile device 1020 such as a PDA including wireless connectivity support or a smart phone. Accordingly, the store 1000 may provide the service but not the devices, if this is desirable, relying on the ubiquity of these devices among the population. The customer identification can be persistent, where the same customer identification is used more than once to identify the customer.

One with regular skill in the art will also appreciate that the mobile device 1020 need not be of one specific make. The only requirement for using a particular device in a particular store is that the device be able to provide and receive the needed information, e.g., the product identifiers) using the appropriate communications protocol, such as, HTTP. This means that different users can use their own heterogeneous Personal Digital Assistants (PDA's) as long as each meets the given store's requirements.

Having described preferred embodiments of a method of servicing a consumer, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

What is claimed is:

1. A method for providing sales support, comprising the steps of:
    issuing a customer a mobile device and a corresponding identification, wherein the mobile device issues an electronic service request including a customer purchase order for a product having a product identifier;
    receiving the electronic service request including the customer purchase order;
    tracking a location of the mobile device issued to the customer; and
    delivering the product to a checkout register according to the location to which the mobile device is tracked.

2. The method of claim 1, further comprising the step of issuing the customer a mobile device, wherein the mobile device determines the product identifier.

3. The method of claim 1, wherein the customer identification is persistent.

4. The method of claim 1, wherein the customer identification is issued with the service request.

5. The method of claim 1, further comprising the step of storing the service request in a customer database corresponding to the customer identification.

6. The method of claim 1, wherein the product identifier is determined according to one of a product radio frequency identification tag, a bar code scan, a verbal description provided by the customer, a digital photo, and an alphanumeric identification.

7. A method for providing sales support, enabling a business and a customer to communicate via a mobile device, comprising of the steps of:
    issuing the customer the mobile device;
    receiving an electronic service request including a product identifier and a customer query via the mobile device;
    retrieving data corresponding to the product identifier from a product database;
    determining a portion of the data corresponding to the product identifier and relating to the customer query;
    delivering an electronic reply to the mobile device including the portion of the data corresponding to the product identifier and relating to the customer query;
    determining a customer purchase order for a selected product, the electronic service request including the customer purchase order;
    tracking a location of the mobile device issued to the customer to a checkout register; and
    delivering the selected product to the checkout register according to the location to which the mobile device is tracked.

8. The method of claim 7, further comprising the step of issuing the customer a customer identification, wherein the customer identification associates the mobile device with the customer.

9. The method of claim 8, wherein the database stores the association between the mobile device and the customer.

10. The method of claim 8, further comprising the steps of:
    making the association upon issuing the mobile device to the consumer; and
    breaking the association upon return of the mobile device to the business.

11. The method of claim 7, further comprising the step of tracking the customer within the store based on a position of the mobile device in relation to a plurality of beacons.

12. The method of claim 11, wherein a server stores positions over time as position data.

13. The method of claim 12, further comprising the steps of:
    logging the position data; and
    mining the position data for a pattern of movement.

14. The method of claim 7, wherein the product identifier is determined according to one of a product radio frequency identification tag, a bar code scan, a verbal description provided by the customer, a digital photo, and an alphanumeric identification.

15. The method of claim 7, wherein the query is a customer specified question or comment about a product corresponding to the product identifier.

16. The method of claim 7, wherein the customer query comprises one of a digital photo and a voice memo.

* * * * *